United States Patent [19]

Cornell

[11] 4,098,760
[45] Jul. 4, 1978

[54] SUBSTITUTED HALOACETAMIDE ANTIOXIDANTS FOR ELASTOMERS AND PLASTIC POLYMERS

[75] Inventor: Robert J. Cornell, Naugatuck, Conn.
[73] Assignee: Uniroyal, Inc., New York, N.Y.
[21] Appl. No.: 758,972
[22] Filed: Jan. 13, 1977
[51] Int. Cl.$^2$ .................. C07C 103/44; C07C 103/38
[52] U.S. Cl. .......................... 260/45.9 NC; 260/562 B
[58] Field of Search .................... 260/562 B, 45.9 NC

[56] References Cited

U.S. PATENT DOCUMENTS

| | | | |
|---|---|---|---|
| 3,377,315 | 4/1968 | Ashton | 260/45.9 NC |
| 3,907,893 | 7/1975 | Parker | 260/45.9 NC |
| 3,919,269 | 11/1975 | Jaffe et al. | 260/45.9 NC |
| 3,972,927 | 8/1976 | Susi et al. | 260/45.9 NC |

FOREIGN PATENT DOCUMENTS

| | | | |
|---|---|---|---|
| 579,584 | 7/1959 | Canada | 260/562 |
| 1,284,502 | 1/1962 | France | 260/562 |
| 1,463,732 | 12/1966 | France | 260/562 |
| 1,046,063 | 11/1958 | Fed. Rep. of Germany | 260/562 |
| 206,896 | 8/1939 | Switzerland | 260/562 |

*Primary Examiner*—Arthur P. Demers
*Attorney, Agent, or Firm*—James J. Long

[57] ABSTRACT

Elastomers and plastic polymers are protected against deterioration by certain new substituted haloacetamide antioxidants which are non-migratory and resist extraction by oils and solvents, of the type

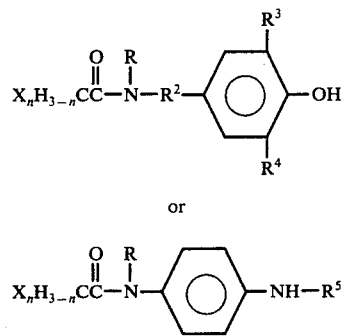

e.g., 4-anilino-2,2,2-trichloroacetanilide protects NBR even after sequential exposure to oil and to air at elevated temperature.

23 Claims, No Drawings

SUBSTITUTED HALOACETAMIDE ANTIOXIDANTS FOR ELASTOMERS AND PLASTIC POLYMERS

This invention relates to certain substituted haloacetamide antioxidants, and to a method of protecting elastomeric or plastic polymers with such antioxidants, as well as to elastomeric or plastic compositions protected with such antioxidants.

Conventional antioxidants for polymers, as represented by the typical known antioxidants for rubbers or plastics, unfortunately frequently have the undesirable characteristics of leaching out of the polymer when the polymer is exposed in use to contact with oils or solvents, with the result that over a period of time in such service the effectiveness of the antioxidant in protecting the polymer is diminished. The present invention is directed to non-migratory stabilizers or antioxidants which resist migration within the polymer and leaching out by oils or solvents; they have reduced tendency to blooming, usually caused by migration of the antioxidant to the polymer surface.

In accordance with the present invention, it has now been found that certain novel substituted haloacetamides, when added to polymers, afford improved protection to the polymer even after oil-air sequential aging at elevated temperatures.

The substituted haloacetamides of the invention have the formula

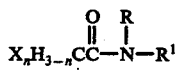
    I wherein:

X is halogen (fluorine, chlorine, bromine or iodine);
$n$ has a value of 1, 2 or 3;
R is hydrogen, an alkyl radical having 1 to 18 carbon atoms (linear or branched, primary, secondary or tertiary), a cycloalkyl radical having 5 to 9 carbon atoms, an aryl radical having 6 to 12 carbon atoms, or an aralkyl or alkaryl group having 7 to 10 carbon atoms;
$R^1$ is a group having the structural formula

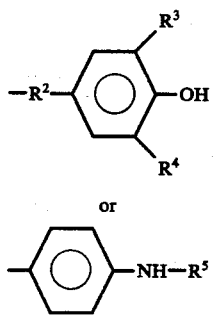

wherein:

$R^2$ is a single covalent bond, an alkylene radical having 1 to 6 carbon atoms, an alkylidene radical having 2 to 6 carbon atoms, a cycloalkylene radical having 5 to 9 carbon atoms, an arylene radical having 6 to 12 carbon atoms, or an alkarylene or aralkylene radical having 7 to 10 carbon atoms;
$R^3$ and $R^4$ may be the same or different and are hydrogen or alkyl radicals having 1 to 9 carbon atoms (linear or branched, primary, secondary or tertiary); and
$R^5$ is a cycloalkyl group having 5 to 8 carbon atoms, aryl having 6 to 10 carbon atoms or alkaryl having 7 to 10 carbon atoms;
with the further proviso that when $R^1$ is a group having the formula II, then R may also be a group having the formula II.

Preferred antioxidants of the invention are those of the above formula I wherein X is fluorine or chlorine; $n$ is 2 or 3; R is hydrogen, $C_1-C_{12}$ alkyl, cyclohexyl, phenyl, naphthyl or a substituent of structural formula II if $R^1$ has the meanings of formula II; $R^2$ is $C_1-C_4$ alkylene, $C_2-C_3$ alkylidene, cyclohexylene, phenylene or naphthylene; $R^3$ and $R^4$ are hydrogen or $C_1-C_5$ alkyl; and $R^5$ is cycloalkyl $C_5-C_6$, phenyl, tolyl, xylyl or naphthyl.

The most preferred practice of the invention involves the use of formula I chemicals wherein X is chlorine; $n$ is 2 or 3; R is hydrogen, $C_1-C_6$ alkyl, cyclohexyl or phenyl; $R^2$ is methylene, ethylene, propylene, isobutylene, isopropylidene or phenylene; $R^3$ and $R^4$ are tertiary butyl; and $R^5$ is cyclohexyl or phenyl.

Typical examples for substituent R are the following radicals: methyl, ethyl, n-propyl, isopropyl, n-butyl, s-butyl, t-butyl, n-pentyl, 3-methylbutyl, n-hexyl, 1,3-dimethylbutyl, n-heptyl, 1,4-dimethylpentyl, n-octyl, 2-octyl, 1,1,3-trimethypentyl, decyl, dodecyl, octadecyl, cyclopentyl, cyclohexyl, cyclooctyl, cyclononyl, phenyl, biphenylyl, naphthyl, benzyl, phenethyl, phenisopropyl, tolyl, xylyl, mesityl, and the like.

Substituents representative of structural formula II include: 4-hydroxyphenyl, 3-methyl-4-hydroxyphenyl, 3-ethyl-4-hydroxyphenyl, 3-n-propyl-4-hydroxyphenyl, 3-isopropyl-4-hydroxyphenyl, 3-n-butyl-4-hydroxyphenyl, 3-s-butyl-4-hydroxyphenyl, 3-t-butyl-4-hydroxyphenyl, 3-octyl-4-hydroxyphenyl, 3,5-dimethyl-4-hydroxyphenyl, 3,5-diethyl-4-hydroxyphenyl, 3,5-diisopropyl-4-hydroxyphenyl, 3,5-di-s-butyl-4-hydroxyphenyl, 3,5-di-t-butyl-4- hydroxyphenyl, 3,5-dioctyl-4-hydroxyphenyl, 3-methyl-5-t-butyl-4-hydroxyphenyl, 3-isopropyl-5-t-butyl-4-hydroxyphenyl, and the like wherein $R^2$ has the meanings described above.

When $R^1$ has the structural formula III, $R^1$ may for instance be a moiety such as 4'-(cyclopentylamino)phenyl, 4'-(cyclohexylamino)phenyl, 4'-(cyclooctylamino)phenyl, 4'-anilinophenyl, 4'-(p-tolylamino)phenyl, 4'-(o-tolylamino)phenyl, 4'-(2,3-dimethylphenylamino)phenyl, 4'-(2,4-dimethylphenylamino)phenyl, 4'-(3,5-dimethylphenylamino)phenyl, 4'-(1-naphthylamino)phenyl or 4'-(2-naphthylamino)phenyl.

It will be noted that structures II and III, that is, the values of the $R^1$ moiety of formula I, include residues of numerous conventional antioxidants of the phenolic and diphenylamine types, respectively. In one aspect, the invention is based on the surprising discovery that modification of the conventional phenolic or diphenylamine antioxidant structures by attaching thereto the haloacetamide radical

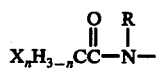

unexpectedly results in an improved antioxidant that is non-migratory and resists extraction by oils and solvents, and that is remarkably effective, as will be demonstrated hereinbelow.

The described antioxidants are suitable for protecting polymers including both elastomers and plastics, e.g., natural rubber and synthetic rubbers such as those based on conjugated dienes (e.g. polyisoprenes, polychloroprene, polybutadienes) or copolymers of dienes with copolymerizable monomers such as styrene, acrylonitrile, acrylic acid, acrylates, isobutylene, vinyl pyridine, etc. as well as copolymer elastomers based on ethylene and mono-alpha-olefins such as propylene, butene-1, hexene-1, etc. or terpolymers including therein a copolymerizable polyene such as 1,4-hexadiene, dicyclopentadiene, alkylidene-norbornenes such as 5-ethylidene-2-norbornene. Plastic materials that may be stabilized include poly-alpha-olefin homopolymers such as polyethylene, polypropylene, homo- or copolymers based on ethylenically unsaturated monomers, such as styrene, acrylonitrile, vinyl pyridine, alkyl vinyl esters, vinyl ethers, acrylic acid and acrylates. Other materials that can be protected with the compounds of this invention are elastomers or plastics such as polyurethanes, polysulfones, polyamides, polyesters, polycarbonates, and polymeric blends or graft polymers such as ABS polymers and grafts of such monomers as styrene and acrylonitrile on an EPDM rubber spine.

The present invention antioxidants are particularly useful for the protection of such polymers which suffer exposure to oils and solvents because these antioxidants resist migration within the polymer and leaching out of the polymer. In a preferred practice of the invention the polymer to which the antioxidant is added is an oil-resistant elastomer, notably polychloroprene, chlorosulfonated polyethylene, polyacrylate rubber, and butadiene-acrylonitrile copolymer rubber. In the case of butadiene-acrylonitrile rubber, the ratio of monomers usually ranges from 85/15 to 35/65. The preferred range is 75/25 to 55/45.

Suitable compounds for carrying out the invention include: N-[beta-(3,5-di-t-butyl-4-hydroxyphenyl)ethyl]-2,2-dichloroacetamide; N-t-butyl-N-[6-(4-hydroxyphenyl)-hexyl]-2,2-dibromoacetamide; N-n-hexyl-N-[2-(3-secbutyl-5-t-butyl-4-hydroxybenzyl)-2-propyl]-2-fluoroacetamide; N-cyclohexyl-N-(3,5-dimethyl-4-hydroxyphenyl)-2-iodoacetamide; N-phenyl-N-(3,5-di-n-nonyl-4-hydroxybenzyl)-2,2-dichloroacetamide; N-benzyl-N-[beta-(3,5-diisopropyl-4-hydroxyphenyl)ethyl]-2,2,2-tribromoacetamide; N-(2-phenethyl)-N-[beta-(3,5-di-t-butyl-4-hydroxyphenyl)ethyl]-2-fluoroacetamide; N-[4-(3,5-di-n-amyl-4-hydroxyphenyl)-cyclohexyl]-2-chloroacetamide; N,N-bis-[4-(3-methyl-5-ethyl-4-hydroxyphenyl)phenyl]-2-bromoacetamide; N-(4-methylphenyl)-N-[4-(3,5-di-t-butyl-4-hydroxyphenyl)-naphthyl]-2,2,2-trichloroacetamide; N-naphthyl-N-{[2-(3,5-di-t-butyl-4-hydroxyphenyl)-2-phenyl]ethyl}-2-bromoacetamide; N-[2-(3,5-di-n-nonyl-4-hydroxyphenyl)-2-propyl]-2,2-dichloroacetamide; N-beta-phenethyl-N-(4-cyclopentylaminophenyl)-2,2,2-trichloroacetamide; N-naphthyl-N-4-anilinophenyl-2,2,2-trifluoroacetamide; N-sec-butyl-N-4-anilinophenyl-2,2-dichloroacetamide; N-1,3-dimethylbutyl-N-4-anilinophenyl-2,2-dibromoacetamide; N-isopropyl-N-4-anilinophenyl-2-chloroacetamide; N-1,4-dimethylpentyl-N-4-anilinophenyl-2,2,2-trichloroacetamide; N-1-ethyl-3-methylpentyl-N-4-anilinophenyl-2,2-dichloroacetamide; 4-anilino-2,2-dibromoacetanilide; N-phenyl-N-(4-cyclooctylaminophenyl)-2-iodoacetamide; N-ethyl-N-(4-naphthylaminophenyl)-2,2,2-trifluoroacetamide; N-cyclopentyl-N-[4-(4-methylphenylamino)phenyl]-2-chloroacetamide; N-4-methylphenyl-N-(4-cyclohexylaminophenyl)-2,2-dichloroacetamide; N-1-ethyl-3-methylpentyl-N-[4-(1-ethyl-3-methyl pentylamino)-phenyl]-2,2,2-trichloroacetamide; N-1,4-dimethylpentyl-N-[4-(1,4-dimethylpentylamino)-phenyl]-2,2-dichloroacetamide, and the like.

The rubber or other polymer in which the present antioxidant is employed may be mixed with other compounding ingredients suitable to the polymer and appropriate to the desired end use, in accordance with conventional practice. Thus, the elastomer employed may include conventional fillers, especially reinforcing fillers such as carbon black, frequently in amount of from 10 to 300 parts, the preferred range being 60 to 150 parts, per 100 parts by weight of the polymer. Various types of carbon black can be used ranging from a highly reinforcing SAF type, a medium reinforcing FEF black or a low reinforcing MT black. Other fillers such as silica or clay can be used in place of or in combination with blacks.

Other materials such as lubricants and plasticizers can be added to the stock to improve ease of processing.

The level of the present antioxidant used to protect the polymer frequently ranges from 0.5 part or less to 6 parts or more, based on 100 parts by weight of polymer. In many cases the preferred range is 1.0 to 4 parts. These new antioxidants can be used alone or in combination with known antioxidants or stabilizers for maximum protection of the rubber or other polymer against deterioration.

In the case of curable or vulcanizable polymers, the composition usually includes curvatives appropriate to the particular polymer, such as standard sulfur, sulfur donor, or peroxide cure systems familiar to those skilled in the art.

The polymer may be blended with the antioxidant of the invention, and any other desired ingredients, in the usual rubber or plastic mixing equipment, and then may be shaped by conventional methods such as calendering, extrusion, injection or compression molding, or the like, or the composition may even be deposited from a solution or dispersion, for example in a coating or impregnating operation. In the case of polymers available as solutions or dispersions (e.g. latex) the antioxidant of the invention may be blended with the polymer by adding the antioxidant to such solution or dispersion.

Thereafter, in the case of vulcanizable compositions, the shaped article may be subjected to conventional curing conditions to produce the final article, depending on such variables as the particular polymer, the kind and amount of curative, the size of the article, the character of the heating device, etc. Cure may be effected either in a closed mold, or in an autoclave, or in an open heating device such as an oven.

The haloacetamide compounds of the invention can be prepared by reacting a haloacetyl halide with an appropriate primary or secondary amine such as 4-aminodiphenylamine or N-phenyl-N'-sec-butyl-p-phenylenediamine essentially without any undesired by-products. For example, the amine, a solvent, and a hydrogen halide scavenger are added to the reactor under an inert atmosphere. With stirring, a mixture of the haloacetyl halide and solvent is added over a 30 minute period. Generally equimolar amount of haloacetyl halides and amines are used. One may use a slight excess of the haloacetyl halide to assure complete reaction of the amine. Unreacted haloacetyl halide is converted to the acid during water washing of the reaction product and is removed due to its water solubility. Various types of hydrogen halide scavengers well known to the art can be employed such as sodium carbonate, pyridine or tertiary amines (e.g. triethyl amine).

Typical procedures for preparation of antioxidants of the invention are as follows:

COMPOUND 1

4'-Anilino-2,2,2-trichloroacetanilide

The following materials are charged to a reactor: 62.5 g (0.34 mole) 4-aminodiphenylamine, 39 g (0.37 mole) sodium carbonate and 500 ml benzene. To this stirred mixture, under nitrogen, is added a solution of 63.8 (0.35 mole) trichloroacetyl chloride in 100 ml benzene over a thirty minute period. Stirring is continued for another 3½ hours. The crude product containing sodium chloride by-product is dried to remove solvent. The dried material is washed first with dilute HCl, then distilled water, air dried and the product is recrystallized from a methanol/benzene (½) solvent mixture. Melting point and elementary analysis are reported in Table I.

COMPOUND 2

4'-Anilino-2,2-dichloroacetanilide

This compound is prepared from 4-aminodiphenylamine (36.8 g) in the same manner as Compound 1, except that dichloroacetyl chloride (29.8 g) is used in place of trichloroacetyl chloride. The product is recrystallized from benzene. The m.p. and chemical analysis are reported in Table I.

COMPOUND 3

4'-Anilino-2-chloroacetanilide

This compound is prepared in the same manner as Compound 1, except that monochloroacetyl chloride (24 g) is used in place of trichloroacetyl chloride. The product is recrystallized from benzene. The m.p. and chemical analysis are reported in Table I.

COMPOUND 4

N-Cyclohexyl-N-4'-anilinophenyl-2,2,2-trichloroacetamide

This compound is prepared in the same manner as Compound 1, except that N-phenyl-N'-cyclohexyl-p-phenylenediamine (26.6 g) and dry pyridine (20 g) are used in place of 4-aminodiphenylamine and sodium carbonate respectively. After trichloroacetyl chloride (20 g) addition, the reaction temperature is increased to 50° (all temperatures are expressed herein in degrees Centigrade, unless otherwise indicated). The pyridine hydrochloride formed is filtered off. The benzene solution is first washed with dilute HCl, then with distilled water, followed by drying over MgSO$_4$. The dried benzene solution is filtered to remove the drying aid and allowed to evaporate to dryness. A white crystalline material is formed. The product is recrystallized from benzene. The m.p. and chemical analysis are reported in Table I.

COMPOUND 5

N-sec-Butyl-4'-anilinophenyl-2,2,2-trichloroacetamide

This compound is prepared in the same manner as Compound 1, except that N-phenyl-N'-sec-butyl-p-phenylenediamine (24 g) and dry pyridine (20 g) are used in place of 4-aminodiphenylamine and sodium carbonate, respectively. After trichloroacetyl chloride (20 g) addition, the reaction temperature is increased to 50°. Work-up of the reaction mixture is done in the same manner as Compound 4. The product is recrystallized from benzene. The m.p. and chemical analysis are reported in Table I.

COMPOUND 6

N-(1,3-Dimethylbutyl)-N-4'-anilinophenyl-2,2,2-trichloroacetamide

This compound is prepared in the same manner as Compound 1, except that N-phenyl-N'-(1,3-dimethylbutyl)-p-phenylenediamine (26.8 g) and dry pyridine (20 g) are used in place of 4-aminodiphenylamine and sodium carbonate respectively. After trichloroacetyl chloride (20 g) addition, the reaction temperature is increased to 50°. Work up of the reaction mixture is done in the same manner as Compound 4. The product is recrystallized from a hexane/benzene (5/1) mixture. The m.p. and chemical analysis are reported in Table I.

COMPOUND 7

N-[beta-(3,5-Di-t-butyl-4-hydroxyphenyl)ethyl]-2,2,2-trichloroacetamide

This compound is prepared in essentially the same manner as Compound 1, except that 2-(3,5-di-t-butyl-4-hydroxyphenyl)ethylamine is used in place of 4-aminodiphenylamine. The product is recrystallized from a hexane/benzene (5/1) solvent mixture. The m.p. and chemical analysis are reported in Table I.

COMPOUND 8

N-[2-(3,5-Di-t-butyl-4-hydroxybenzyl)-2-propyl]-2,2,2-trichloroacetamide

This compound is prepared in essentially the same manner as Compound 1, except that 2-(3,5-di-t-butyl-4-hydroxybenzyl)-2-propylamine (20.8 g) and dry pyridine (11.6 g) are used in place of 4-aminodiphenylamine and sodium carbonate respectively with trichloroacetyl chloride (14.0 g). The pyridine hydrochloride formed is filtered off. The benzene solution is first washed with dilute HCl, then with distilled water and finally is dried over MgSO$_4$. The dried benzene solution is filtered to remove the drying aid and allowed to evaporate to dryness. A white crystalline material is formed. The m.p. and chemical analysis are reported in Table I.

COMPOUND 9

N,N-Bis[beta-(3,5-di-t-butyl-4-hydroxyphenyl)-ethyl]-2,2,2-trichloroacetamide This compound is prepared in essentially the same manner as Compound 1, except that N,N-bis[2-(3,5-di-t-butyl-4-hydroxyphenyl)ethyl]amine (24 g) is used in place of 4-aminodiphenylamine. The product is recrystallized from a hexane/benzene (5/1) solvent mixture. The m.p. and chemical analysis are reported in Table I.

COMPOUND 10

2'-Anilino-2,2-dichloroacetanilide (Prior Art)

This compound is prepared in the same manner as Compound I, except that dichloroacetyl chloride (5.75 g) and N-phenyl-o-phenylenediamine (7.0 g) are used in place of trichloroacetyl chloride and 4-aminodiphenylamine, respectively. The product is recrystallized from a hexane/benzene (5/1) solvent mixture. The m.p. and chemical analysis are reported in Table I. This compound, which is also called orthodichloroacetylaminodiphenylamine, is referred to in U.S. Pat. No. 3,250,774, May 10, 1966, Schmidt et al. 4-hydroxyhydrocinnamide)], and Compound D [4,4'-bis(alpha, alpha-dimethylbenzyl)diphenylamine]. In the

TABLE I

| Compound No. | ANALYTICAL DATA OF COMPOUNDS | | | | | | | | | |
|---|---|---|---|---|---|---|---|---|---|---|
| | 1 | 2 | 3 | 4 | 5 | 6 | 7 | 8 | 9 | 10 |
| Melting point, °C | 141–143 | 140–143 | 125–128 | 185–187 | 155–156 | 111–113 | 145–148 | 164–167 | 176–177 | 81–82 |
| Chemical analysis,%: | | | | | | | | | | |
| Calculated C | 50.90 | 57.14 | 64.61 | 58.32 | 56.03 | 58.04 | 54.75 | 57.00 | 65.12 | 56.9 |
| H | 3.33 | 4.08 | 5.00 | 5.10 | 4.92 | 5.56 | 6.59 | 7.12 | 7.98 | 4.0 |
| N | 8.48 | 9.52 | 10.76 | 6.80 | 7.28 | 6.77 | 3.54 | 3.32 | 2.23 | 9.4 |
| Cl | 32.00 | 23.80 | 13.65 | 25.88 | 27.55 | 25.76 | 26.98 | 24.94 | 17.00 | 24.0 |
| Found C | 51.49 | 58.02 | 64.21 | 58.26 | 56.44 | 59.41 | 54.70 | 56.81 | 65.77 | 57.9 |
| H | 3.34 | 4.10 | 4.80 | 5.03 | 4.88 | 5.71 | 6.51 | 7.08 | 7.95 | 4.1 |
| N | 8.48 | 9.69 | 10.30 | 6.51 | 7.24 | 6.87 | 3.60 | 3.43 | 2.40 | 9.5 |
| Cl | 31.33 | 23.27 | 14.72 | 24.45 | 26.14 | 25.40 | 26.42 | 25.02 | 16.87 | 23.8 |

The following examples, in which all quantities are expressed by weight unless otherwise indicated, will serve to illustrate the practice of the invention in more detail.

EXAMPLE 1

This example compares antioxidants of the invention with certain prior art antioxidants. The polymer employed is an oil-resistant elastomer, namely, a butadiene-acrylonitrile copolymer having an acrylonitrile content of about 33% and a Mooney viscosity of 50 (ML-4 at 212° F). The following compounding recipe is used:

100 parts Nitrile rubber
5 parts ZnO
100 parts MT carbon black
1 part Stearic acid
3 parts Tetramethylthiuram disulfide
2 parts N-Cyclohexyl-2-benzothiazolesulfenamide
0.5 part 4,4'-Dithiodimorpholine Seven stocks are prepared, as indicated in Table II. Three of the stocks, namely Stocks 1, 2 and 3, contain antioxidants of the invention, viz., Compound 1, Compound 2 and Compound 3, respectively. Stocks 4, 5, 6 and 7 are outside the invention and are included merely for purposes of comparison to demonstrate the results obtained with certain conventional antioxidant substances. They contain, respectively, Compound A (4-anilinoacetanilide), Compound B (tetrakis[methylene(3-5-di-tert-butyl-4-hydroxyhydrocinnamate)]methane), Compound C [N,N'-hexamethylenebis(3,5-di-tert-butyl-4-hydroxyhydrocinnamide)], and Compound D [4,4'-bis(alpha, alpha-dimethylbenzyl)diphenylamine]. In the Table II stocks, each antioxidant substance is present on an equal weight basis, namely 3 parts per 100 parts of rubber. The stocks are mixed in a Brabender Plasticorder (trademark) at mixing speeds between 25–40 rpm keeping stock temperature below about 105°. The ingredients are charged in the following order of addition (not critical): rubber, black, antioxidants and vulcanizing agents-accelerators. The stocks are mixed for a total of 10 minutes. The stocks are cured in a mold for 10 minutes at 335° F (168° C). Vulcanizate properties are determined by ASTM procedures D-412 and D-2240, in the unaged condition, as well as after 70 hours air aging at 300° F, and again after 70 hours immersion in oil followed by 70 hours in air (300° F). The results are tabulated in Table II.

From the air aging data in Table II one notes that excellent air aging is obtained from the three 4'-anilino (chloro) acetanilides of the invention and compounds A and D. In the case of sequential aging (70 hours #3 ASTM Oil — 300° F followed by 70 hours in air — 300° F), retention of elongation compared to the air aging data is 69–76% when 4-anilino (chloro) acetanilides of the invention are present but it drops to 26% with 4'-anilinoacetanilide, and the stock containing Compound D is too brittle to be tested. Compounds B and C provide unsatisfactory results even after air aging and are too brittle to be tested after sequential aging.

Table II

| Stock No. | 4'-Anilinoacetanilides in Sulfur Donor Black Recipe (Weight Basis) | | | | | | |
|---|---|---|---|---|---|---|---|
| | 1 | 2 | 3 | 4 | 5 | 6 | 7 |
| Compound 1 (parts) | 3.0 | | | | | | |
| Compound 2 | | 3.0 | | | | | |
| Compound 3 | | | 3.0 | | | | |
| Compound A | | | | 3.0 | | | |
| Compound B | | | | | 3.0 | | |
| Compound C | | | | | | 3.0 | |
| Compound D | | | | | | | 3.0 |
| Physical Properties Unaged | | | | | | | |
| 100% Modulus (psi) | 540 | 400 | 330 | 360 | 350 | 340 | 350 |
| 200% Modulus (psi) | 1290 | 860 | 730 | 780 | 720 | 690 | 770 |
| Tensile Strength (psi) | 1840 | 1580 | 1520 | 1490 | 1550 | 1560 | 1570 |
| %Elongation | 400 | 520 | 570 | 510 | 580 | 590 | 510 |
| Shore (A) Hardness | 73 | 71 | 71 | 70 | 70 | 70 | 69 |
| Air Aged | | | | | | | |
| 100% Modulus (psi) | 1570 | 1410 | 1170 | 880 | — | — | 800 |
| Tensile Strength (psi) | 1680 | 1720 | 1330 | 1660 | 1040 | 1090 | 1700 |
| % Elongation | 120 | 130 | 130 | 190 | 70 | 80 | 200 |
| Shore (A) Hardness | 85 | 85 | 82 | 81 | 82 | 82 | 79 |
| #3 ASTM Oil 70 Hrs./Air Oil & Air Aged | | | | | | | |
| 100% Modulus (psi) | — | — | 1380 | — | — | — | — |
| Tensile Strength | 1570 | 1330 | 1380 | 820 | Too Brittle to Test | | |
| % Elongation | 90 | 90 | 100 | 50 | | | |
| Shore (A) Hardness | 86 | 85 | 84 | 83 | 91 | 90 | 91 |
| % Retention of Elongation | 75 | 69 | 77 | 26 | — | — | — |

EXAMPLE 2

In this example a butadiene-acrylonitrile copolymer rubber is employed having an acrylonitrile content of about 33% and a Mooney viscosity of 75 ML-4 at 212° F. The recipe and procedure are essentially the same as in Example 1, except that the various antioxidant substances are employed on an equal molar amount basis (0.0091 mole of antioxidant per 100 parts of rubber), the actual amounts being given in Table III. By adding the antioxidant on a molar basis, the same level of active antioxidant moiety for all materials is obtained.

Air aged data (70 hours — 300° F in air), as shown in Table III are excellent for 4'-anilino(chloro) acetanilides, and for compounds A and D. In the case of sequential aging retention of elongation compared to the air aging data is 43–77% for 4'-anilino(chloro) acetanilides whereas for Compound A it is 35% and Compound D is too brittle for tests. Compounds B and C are unsatisfactory even after air aging and are too brittle to test after sequential aging.

Table III

| 4'-Anilinoacetanilides in Sulfur Donor Black Recipe (Equal Molar Basis) | | | | | | | |
|---|---|---|---|---|---|---|---|
| Stock No. | 8 | 9 | 10 | 11 | 12 | 13 | 14 |
| Compound 1 (parts) | 3.0 | | | | | | |
| Compound 2 | | 2.68 | | | | | |
| Compound 3 | | | 2.40 | | | | |
| Compound A | | | | 2.04 | | | |
| Compound B | | | | | 2.68 | | |
| Compound C | | | | | | 2.88 | |
| Compound D | | | | | | | 3.68 |
| Unaged Physicals | | | | | | | |
| 100% Modulus (psi) | 490 | 370 | 370 | 380 | 360 | 410 | 390 |
| 200% Modulus (psi) | 1090 | 800 | 780 | 810 | 760 | 840 | 840 |
| Tensile Strength (psi) | 1880 | 1580 | 1430 | 1570 | 1700 | 1720 | 1750 |
| % Elongation | 410 | 450 | 340 | 490 | 580 | 520 | 500 |
| Shore (A) Hardness | 73 | 72 | 70 | 70 | 70 | 70 | 70 |
| Air Aged (70 Hrs. at 300° F) | | | | | | | |
| 100% Modulus (psi) | 1420 | 1210 | 1020 | 860 | — | 1200 | 820 |
| Tensile Strength (psi) | 1680 | 1280 | 1630 | 1570 | 1030 | 1210 | 1700 |
| % Elongation | 130 | 110 | 190 | 200 | 80 | 110 | 220 |
| Shore (A) Hardness | 86 | 85 | 83 | 83 | 85 | 84 | 80 |
| #3 ASTM Oil 70 Hrs./Air Oil Aged (70 Hrs. at 300° F) | | | | | | | |
| 100% Modulus (psi) | 1660 | — | — | — | — | — | — |
| Tensile Strength (psi) | 1660 | 1180 | 1100 | 1060 | Too Brittle to Test | | |
| % Elongation | 100 | 80 | 80 | 70 | | | |
| Shore (A) Hardness | 86 | 79 | 83 | 82 | 88 | 88 | 90 |
| % Retention of Elongation with Respect to Air Aging Elongation | 77 | 73 | 42 | 35 | — | — | — |

TABLE IV

| AGING STUDY OF NITRILE RUBBER | | | | | | |
|---|---|---|---|---|---|---|
| Stock No. | 15 | 16 | 17 | 18 | 19 | 20 |
| Compound 2, parts | — | 2.68 | | | | |
| Compound 4, parts | | | 3.74 | | | |
| Compound 5, parts | | | | 3.51 | | |
| Compound 6, parts | | | | | 3.77 | |
| Compound 10, parts | | | | | | 2.68 |
| Physical Properties | | | | | | |
| Unaged | | | | | | |
| 100% Modulus, psi | 410 | 370 | 430 | 450 | 450 | 410 |
| 200% Modulus, psi | 810 | 730 | 960 | 1020 | 1010 | 910 |
| Ultimate Tensile, psi | 1710 | 1740 | 1860 | 1870 | 1770 | 1870 |
| Elongation at Break, % | 500 | 470 | 430 | 400 | 420 | 420 |
| Hardness, Shore A | 71 | 71 | 71 | 72 | 73 | 72 |
| Air Aged | | | | | | |
| 100% Modulus, psi | — | 1320 | 1540 | — | — | — |
| Ultimate Tensile, psi | 580 | 1550 | 1540 | 1480 | 1500 | 630 |
| Elongation at Break, % | 0 | 130 | 100 | 90 | 90 | 10 |
| Hardness, Shore A | 90 | 85 | 86 | 87 | 82 | 89 |
| Oil & Air Aged | | | | | | |
| Ultimate Tensile, psi | 520 | 1400 | 1470 | 1420 | 1300 | 510 |
| Elongation at Break, % | 0 | 65 | 50 | 65 | 50 | 0 |
| Retention of Elongation, % | — | 50 | 50 | 72 | 56 | — |
| Hardness, Shore A | 90 | 82 | 87 | 87 | 87 | 92 |

EXAMPLE 3

Additional antioxidants are evaluated in a butadiene-acrylonitrile compound prepared as described in Example 1, except that 0.75 instead of 0.5 part of 4,4'-dithiodimorpholine is used. To Stocks 16 through 19 compounds of this invention are added whereas Stock 20 contains the prior art compound 2'-anilino-2,2-dichloroacetanilide. The concentration of stabilizer is 0.0091 mole per 100 g of rubber. No stabilizer is added to Stock 15. The air and oil aging test are each carried out for 70 hours at 300° F (149° C). The physical properties of the stocks (before and after aging) are presented in Table IV and indicate that remarkable retention of elongation after oil aging is achieved with respect to elongation values after primary air aging when employing the compounds of this invention, whereas the results obtained with Stock 20 containing the prior art chemical are very similar to those of Stock 15 (no antioxidant).

EXAMPLE 4

Compounds 7, 8 and 9 are incorporated in a nitrile rubber black masterbatch composition essentially as in Example 3 (Stocks 22, 23 and 24 respectively). Simultaneously stocks are prepared and tested containing no stabilizer (21) and the antioxidant Compound B (25). The first air aging test is carried out for 70 hours at 275° F. (135° C), and the oil aging (in No. 3 oil) and second air aging tests are each conducted for 70 hours at 275° F (135° C) as well. The physical property data are listed in Table V indicating that a considerable and unexpected improvement is achieved when using the compounds of this invention. This holds especially true in the retention of elongation after oil-air aging with respect to elongation values after the primary air aging step.

TABLE V

| AGING STUDY IN NITRILE RUBBER | | | | | |
|---|---|---|---|---|---|
| Stock No. | 21 | 22 | 23 | 24 | 25 |
| Compound 7, parts | — | 3.57 | | | |
| Compound 8, parts | | | 2.80 | | |

TABLE V-continued
AGING STUDY IN NITRILE RUBBER

| Stock No. | 21 | 22 | 23 | 24 | 25 |
|---|---|---|---|---|---|
| Compound 9, parts | | | | 3.11 | |
| Compound B parts | | | | | 2.68 |
| Physical Properties | | | | | |
| Unaged | | | | | |
| 100% Modulus, psi | 410 | 470 | 420 | 450 | 350 |
| 200% Modulus, psi | 850 | 1020 | 850 | 1000 | 770 |
| Ultimate Tensile, psi | 1750 | 1870 | 1840 | 1930 | 1740 |
| Elongation at Break, % | 420 | 450 | 440 | 420 | 520 |
| Hardness, Shore A | 69 | 72 | 73 | 71 | 71 |
| Air Aged | | | | | |
| 100% Modulus, psi | — | 1280 | 910 | 1380 | 750 |
| Ultimate Tensile, psi | 590 | 1460 | 1700 | 1590 | 1770 |
| Elongation at Break, % | 90 | 120 | 190 | 130 | 240 |
| Hardness, Shore A | 79 | 82 | 77 | 83 | 79 |
| Oil & Air Aged | | | | | |
| 100% Modulus, psi | — | 1430 | 1160 | 1420 | — |
| Ultimate Tensile, psi | 710 | 1470 | 1200 | 1420 | 790 |
| Elongation at Break, % | 25 | 110 | 100 | 100 | 40 |
| Retention of Elongation, % | 27 | 92 | 53 | 78 | 17 |
| Hardness, Shore A | 84 | 82 | 82 | 81 | 83 |

EXAMPLE 5

Compounds 7, 8 and 9 as well as Compound B are evaluated in an ethylene-propylene-5-ethylidene-2-norbornene terpolymer having an ethylene-propylene weight ratio of 57/43, an iodine number of 18 and a Mooney viscosity (ML-4 at 257° F.) of 52. The ingredients are compounded in the usual fashion using the following recipe:
- 100 parts EPDM
- 40 parts FEF carbon black
- 5 parts Petroleum hydrocarbon processing oil (Sunpar 2280 trademark)
- 5 parts Zinc oxide
- 7 parts Dicumyl peroxide (Dicup 40C; trademark)

The stabilizers are added at levels as indicated in Table VI providing a concentration of what is believed the antioxidatively active group of the compounds to be essentially 4.6 millimoles per 100 g. of EPDM. The cured (press cure at 350° F. for 20 minutes) stocks are first air aged for 70 hours at 325° F., then aged in #3 oil for 70 hours at 257° F. followed by air aging for 70 hours at 325° F. The physical properties of the stocks before and after aging are summarized in Table VI.

The results indicate that Stocks 26 (no anitoxidant present) and 30 (containing Compound B) exhibit greatly reduced ultimate tensile values in comparison to Stocks 27, 28, and 29 which are stabilized with the compounds of this invention. Similarly, the elongations at break of Stocks 26 and 30 are significantly lower than those of Stocks 27, 28 and 29 (according to this invention).

TABLE VI
AGING STUDY IN ETHYLENE-PROPYLENE TERPOLYMER

| Stock No. | 26 | 27 | 28 | 29 | 30 |
|---|---|---|---|---|---|
| Compound 7, parts | | 1.75 | | | |
| 8 parts | | | 1.89 | | |
| 9 parts | | | | 1.40 | |
| B parts | | | | | 1.33 |
| Physical Properties | | | | | |
| Unaged | | | | | |
| 100% Modulus, psi | 400 | 280 | 250 | 240 | 350 |
| 200% Modulus, psi | 1260 | 690 | 640 | 660 | 1000 |
| Ultimate Tensile, psi | 2140 | 2290 | 2410 | 2280 | 2120 |
| Elongation at Break, % | 265 | 390 | 445 | 380 | 295 |
| Hardness, Shore A | 62 | 59 | 57 | 59 | 62 |
| Air Aged | | | | | |
| Ultimate Tensile, psi | 460 | 970 | 1080 | 1120 | 1010 |
| Elongation at Break, % | 95 | 190 | 200 | 215 | 175 |
| Hardness, Shore A | 62 | 64 | 62 | 65 | 65 |

TABLE VI-continued
AGING STUDY IN ETHYLENE-PROPYLENE TERPOLYMER

| Stock No. | 26 | 27 | 28 | 29 | 30 |
|---|---|---|---|---|---|
| Oil & Air Aged | | | | | |
| Ultimate Tensile, psi | 550 | 820 | 760 | 800 | 590 |
| Elongation at break, % | 120 | 205 | 190 | 180 | 130 |
| Hardness, Shore A | 61 | 55 | 57 | 57 | 57 |

What is claimed is:

1. A substituted haloacetamide having the formula

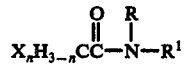

wherein:
X is chlorine;
n is 2 or 3;
R is hydrogen, $C_1$-$C_6$ alkyl, cyclohexyl or phenyl;
$R^1$ is a group having the structural formula:

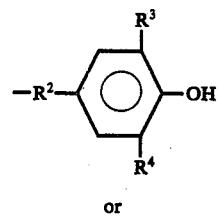

II.

or

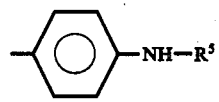

III.

wherein:
$R^2$ is methylene, ethylene, propylene, isobutylene, isopropylidene or phenylene;
$R^3$ and $R^4$ are tertiary butyl; and
$R^5$ is phenyl.

2. The substituted haloacetamide of claim 1 which is 4'-anilino-2,2,2-trichloroacetanilide.

3. The substituted haloacetamide of claim 1 which is 4'-anilino-2,2-dichloroacetanilide.

4. The substituted haloacetamide of claim 1 which is N-cyclohexyl-N-4'-anilinophenyl-2,2,2-trichloroacetamide.

5. The substituted haloacetamide of claim 1 which is N-sec-butyl-N-4'-anilinophenyl-2,2,2-trichloroacetamide.

6. The substituted haloacetamide of claim 1 which is N-(1,3-dimethylbutyl)-N-4'-anilinophenyl-2,2,2-trichloroacetamide.

7. The substituted haloacetamide of claim 1 which is N-[beta-(3,5-di-t-butyl-4-hydroxyphenyl)ethyl]-2,2,2-trichloroacetamide.

8. The substituted haloacetamide of claim 1 which is N-[2-(3,5-di-t-butyl-4-hydroxybenzyl)-2-propyl]-2,2,2-trichloroacetamide.

9. N,N-bis[beta-(3,5-di-t-butyl-4-hydroxyphenyl)ethyl]-2,2,2-trichloroacetamide.

10. A composition comprising an elastomeric or plastic polymer normally subject to oxidative deterioration, in admixture with, in an amount effective to protect the polymer against oxidative deterioration, a substituted haloacetamide as in claim 1.

11. The composition of claim 10, in which the polymer is an oil-resistant elastomer selected from the group consisting of polychloroprene, chlorosulfonated polyethylene, polyacrylate rubber and butadiene-acrylonitrile copolymer rubber.

12. The composition of claim 10, in which the polymer is butadiene-acrylonitrile copolymer rubber.

13. The composition of claim 10, in which the substituted haloacetamide is 4'-anilino-2,2,2-trichloroacetanilide.

14. The composition of claim 10, in which the substituted haloacetamide is 4'-anilino-2,2-dichloroacetanilide.

15. The composition of claim 10, in which the substituted haloacetamide is N-cyclohexyl-N-4'-anilinophenyl-2,2,2-trichloroacetamide.

16. The composition of claim 10, in which the substituted haloacetamide is N-sec-butyl-N-4'-anilinophenyl-2,2,2-trichloroacetamide.

17. The composition of claim 10, in which the substituted haloacetamide is N-(1,3-dimethylbutyl)-N-4'-anilinophenyl-2,2,2-trichloroacetamide.

18. The composition of claim 10, in which the substituted haloacetamide is N-[beta-(3,5-di-t-butyl-4-hydroxyphenyl)ethyl]-2,2,2-trichloroacetamide.

19. The composition of claim 10, in which the substituted haloacetamide is N-[2-(3,5-di-t-butyl-4-hydroxybenzyl)-2-propyl]-2,2,2-trichloroacetamide.

20. A composition comprising an elastomeric or plastic polymer normally subject to oxidative deterioration, in admixture with N,N-bis [beta(3,5-di-t-butyl-4-hydroxyphenyl)ethyl]-2,2,2-trichloroacetamide in an amount effective to protect the polymer against oxidative deterioration.

21. A method of protecting from oxidative deterioration an elastomeric or plastic polymer normally subject to oxidative deterioration comprising mixing the polymer with a substituted haloacetamide as in claim 1 in an amount effective to protect the polymer against oxidative deterioration.

22. The method of claim 21 in which the polymer is butadiene-acrylonitrile copolymer rubber.

23. The method of claim 21 in which the polymer is an oil-resistant elastomer selected from the group consisting of polychloroprene, chlorosulfonated polyethylene, polyacrylate rubber and butadiene-acrylonitrile rubber.

* * * * *